US009495917B2

(12) United States Patent
Yamada

(10) Patent No.: US 9,495,917 B2
(45) Date of Patent: Nov. 15, 2016

(54) METHOD OF CONTROLLING DISPLAY DEVICE, DISPLAY DEVICE, AND CONTROL DEVICE FOR DISPLAY DEVICE

(75) Inventor: Yusuke Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 953 days.

(21) Appl. No.: 13/096,961

(22) Filed: Apr. 28, 2011

(65) Prior Publication Data

US 2011/0279432 A1 Nov. 17, 2011

(30) Foreign Application Priority Data

May 13, 2010 (JP) ................................. 2010-110881

(51) Int. Cl.
*G06F 3/038* (2013.01)
*G09G 3/34* (2006.01)

(52) U.S. Cl.
CPC .......... *G09G 3/344* (2013.01); *G09G 2310/04* (2013.01); *G09G 2320/0252* (2013.01)

(58) Field of Classification Search
None
See application file for complete search history.

(56) References Cited

U.S. PATENT DOCUMENTS 4,670,772 A * 6/1987 Bolger ..................... H04N 9/28 348/450
5,266,937 A * 11/1993 DiSanto ............... G09G 3/3446 345/107
7,773,069 B2 * 8/2010 Miyasaka .............. G09G 3/344 345/105
8,373,649 B2 * 2/2013 Low ...................... G06F 3/0481 345/107
2002/0110351 A1 * 8/2002 Champion ................ G06T 1/60 386/232

(Continued)

FOREIGN PATENT DOCUMENTS

CN 101542385 A 9/2009
JP 2009-251615 10/2009
WO 2008/153211 A1 12/2008

OTHER PUBLICATIONS

Extended European Search Report dated Apr. 20, 2012 as received in application No. 11 165 511.4.

*Primary Examiner* — Seokyun Moon
*Assistant Examiner* — Douglas M Wilson
(74) *Attorney, Agent, or Firm* — Maschoff Brennan

(57) ABSTRACT

There is provided a method of controlling a display device in which a write operation for changing a display state of one pixel is performed by performing a plurality of operations of applying a driving voltage. The method includes determining whether a previous write operation is currently performed for the one pixel in a case where a new write operation is determined to be required and starting the new write operation for the one pixel in a case where the write operation for the one pixel is determined not to be currently performed in the determining of whether a previous write operation is currently performed, and continuing the write operation that is currently performed and starting the new write operation for the one pixel after completion of the previous write operation in a case where the write operation is determined to be currently performed for the one pixel.

13 Claims, 9 Drawing Sheets

(56) References Cited

U.S. PATENT DOCUMENTS

| | | | | |
|---|---|---|---|---|
| 2003/0090486 | A1* | 5/2003 | Ashburn | G06T 15/005 345/422 |
| 2005/0179679 | A1* | 8/2005 | Hosaka | G09G 3/3611 345/204 |
| 2006/0097982 | A1* | 5/2006 | Arai | G09G 3/38 345/105 |
| 2007/0205978 | A1 | 9/2007 | Zhou et al. | |
| 2007/0273628 | A1* | 11/2007 | Sato | G09G 3/3648 345/87 |
| 2007/0296690 | A1 | 12/2007 | Nagasaki | |
| 2009/0040201 | A1 | 2/2009 | Kim et al. | |
| 2009/0256798 | A1 | 10/2009 | Low et al. | |
| 2009/0256868 | A1 | 10/2009 | Low et al. | |
| 2009/0262123 | A1* | 10/2009 | Yoshitake | B41J 3/46 345/555 |
| 2010/0060623 | A1* | 3/2010 | Van Delden | G09G 3/3446 345/211 |
| 2010/0238093 | A1* | 9/2010 | Lu | G09G 3/344 345/77 |
| 2011/0001748 | A1 | 1/2011 | Rutman et al. | |
| 2011/0025668 | A1* | 2/2011 | Huitema | G09G 3/348 345/211 |
| 2011/0279432 | A1 | 11/2011 | Yamada | |
| 2012/0062547 | A1 | 3/2012 | Yamada | |

* cited by examiner

METHOD OF CONTROLLING DISPLAY DEVICE, DISPLAY DEVICE, AND CONTROL DEVICE FOR DISPLAY DEVICE

BACKGROUND

1. Technical Field

The present invention relates to a method of controlling a display device, a display device, and a control device for a display device.

2. Related Art

An electrophoretic display device is configured by sealing an electrophoretic dispersion liquid that contains one or more types of electrophoretic particles and an electrophoretic dispersion medium between opposing transparent electrodes, at least one of which is transparent, forming one set. By applying a voltage between two electrodes, the electrophoretic particles move inside the electrophoretic dispersion medium so as to change the distribution thereof. Accordingly, the optical reflection characteristics thereof change, thereby information can be displayed. At this time, in a case where one of the electrodes is configured by a plurality of pixel electrodes separated from one another, by controlling the electric potential of each pixel electrode, the distribution of the particles can be formed so as to be different for each pixel, whereby an image can be formed.

Since it takes a relatively long time to change the display state of an electrophoretic display device, in order to rewrite the display of an active-matrix-type electrophoretic display device, a technology of performing a rewrite operation by using a plurality of frames is known. Here, when a write operation is started once for the entire screen, as in a liquid crystal display device, for rewriting the display of an electrophoretic display device, a new write operation cannot be started for several frames. Accordingly, the sensed response speed is low. As a method of solving such a problem, as disclosed in JP-A-2009-251615 or the like, a method is known in which a write operation is performed by performing a pipeline process in units of a partial area. According to this method, in a case where an image is continuously written into two partial areas of the screen, which do not overlap each other, even when a write operation for one partial area, which was started first, has not been completed, a write operation for the other partial area, which is started later, can be started. Therefore, the display speed is improved.

However, according to the method disclosed in JP-A-2009-251615, in a case where partial areas overlap each other in part, the driving of a partial area for which a write operation is started later need to wait until a write operation for another partial area, which was started first, is completed. Accordingly, the display speed is lowered. Although a method may be used in which the partial areas are controlled by software so as not to overlap each other, in such a case, the development of the software is highly complicated.

SUMMARY

An advantage of some aspects of the invention is that it improves the sensed response speed of an electrophoretic display device.

According to an aspect of the invention, there is provided a method of controlling a display device that has a display unit including a plurality of scanning lines, a plurality of data lines, and a plurality of pixels in which a write operation for changing a display state of one pixel out of the plurality of pixels from a first display state to a second display state is performed by performing a plurality of operations of applying a driving voltage. The method includes: determining whether or not a new write operation is required for the one pixel; determining whether or not a previous write operation is currently performed for the one pixel in a case where the new write operation is determined to be required; and starting the new write operation for the one pixel in a case where the write operation for the one pixel is determined not to be currently performed in the determining of whether or not a previous write operation is currently performed, and continuing the write operation that is currently performed and starting the new write operation for the one pixel after completion of the previous write operation in a case where the write operation is determined to be currently performed for the one pixel in the determining of whether or not a previous write operation is currently performed.

According to the above-described method, it is determined whether or not a write operation is currently performed in units of a pixel, and a new write operation can be started as needed from a pixel for which the writing operation has been completed. Accordingly, even in a display device having a relatively long rewriting time, the response speed of an image display can be improved.

In addition, it is preferable that the above-described method further includes storing write information that indicates whether or not the write operation is currently performed for the one pixel in a first storage area, wherein, in the determining of whether a previous write operation is currently performed, it is determined whether or not the write operation is currently performed for the one pixel is determined based on the write information stored in the first storage area.

In such a case, it can be easily determined whether or not the write operation is currently performed.

In addition, it is preferable that the above-described method further includes: storing display image data to be displayed on the display unit based on the input display image data in a second storage area; and storing data of a target image to be displayed on the display unit by the write operation that is currently performed in a third storage area, wherein, in the storing of data of a target image, pixel data of the one pixel is replaced with pixel data corresponding to data of the display image at a timing when the new write operation is started for the one pixel, and, in the determining of whether a new write operation is required, the new write operation is determined to be required for the one pixel in a case where the pixel data of the display image that is stored in the second storage area and the pixel data of the target image that is stored in the third storage area are different from each other.

In such a case, it can be easily determined whether or not a new write operation is required. In addition, as long as the display image data and the target image data coincide with each other, no pixel is detected as a pixel for which a new write operation is required, whereby an unnecessary write operation can be excluded.

In addition, in the above-described method, the write information stored in the first storage area may be either first data indicating that the write operation is currently performed for the one pixel or second data indicating that the write operation for the one pixel is not currently performed.

In such a case, it can be easily determined whether or not the write operation is currently performed.

In addition, in the above-described method, it may be configured that the write information stored in the first storage area includes first write information that indicates whether or not the write operation for changing the display state of the one pixel from the first display state to the second display state is currently performed and second write information that indicates whether or not the write operation for changing the display state of the one pixel from the second display state to the first display state is currently performed, the write information is a value that is changed in accordance with the number of the operations of applying a driving voltage, which have been already performed, in a case where the write operation is currently performed, and the write information is a value indicating that the write operation is not currently performed for the one pixel after the last operation of applying a driving voltage is performed in the write operation.

In such a case, the write information can be acquired through a simple process.

According to another aspect of the invention, there is provided a display device that has a display unit including a plurality of scanning lines, a plurality of data lines, and a plurality of pixels in which a write operation for changing a display state of one pixel out of the plurality of pixels from a first display state to a second display state is performed by performing a plurality of operations of applying a driving voltage. The display device includes: a rewriting determining unit that determines whether a new write operation is required for the one pixel; a writing state determining unit that determines whether or not a previous write operation is currently performed for the one pixel in a case where the new write operation is determined to be required; and a writing control unit that starts the new write operation for the one pixel in a case where the write operation for the one pixel is determined not to be currently performed by the writing state determining unit, and continues the write operation that is currently performed and starts the new write operation for the one pixel after completion of the previous write operation in a case where the write operation is determined to be currently performed for the one pixel by the write state determining unit.

According to the above-described display device, it is determined whether or not a write operation is currently performed in units of a pixel, and a new write operation can be started as needed from a pixel for which the writing operation has been completed. Accordingly, even in a display device having a relatively long rewriting time, the response speed of an image display can be improved.

In addition, it is preferable that the above-described display device further includes a writing information updating unit that stores write information that indicates whether or not the write operation is currently performed for the one pixel in a first storage area, wherein the writing state determining unit determines whether or not the write operation is currently performed for the one pixel based on the write information stored in the first storage area.

In such a case, it can be easily determined whether or not the write operation is currently performed.

In addition, it is preferable that the above-described display device further includes: a display image data updating unit that stores display image data to be displayed on the display unit in a second storage area; and a target image data updating unit that stores data of a target image to be displayed on the display unit by the write operation that is currently performed in a third storage area, wherein the target image data updating unit replaces pixel data of the one pixel with pixel data corresponding to data of the display image at a timing when the new write operation is started for the one pixel, and the rewriting determining unit determines that the new write operation is required for the one pixel in a case where the pixel data of the display image that is stored in the second storage area and the pixel data of the target image that is stored in the third storage area are different from each other.

In such a case, it can be easily determined whether or not a new write operation is required. In addition, as long as the display image data and the target image data coincide with each other, no pixel is detected as a pixel for which a new write operation is required, whereby an unnecessary write operation can be excluded.

In the above-described display device, the write information stored in the first storage area may be either first data indicating that the write operation is currently performed for the one pixel or second data indicating that the write operation for the one pixel is not currently performed.

In such a case, it can be easily determined whether or not the write operation is currently performed.

In addition, in the above-described display device, it may be configured that the write information stored in the first storage area includes first write information that indicates whether or not the write operation for changing the display state of the one pixel from the first display state to the second display state is currently performed and second write information that indicates whether or not the write operation for changing the display state of the one pixel from the second display state to the first display state is currently performed, the write information is a value that is changed in accordance with the number of the operations of applying a driving voltage, which have been already performed, in a case where the write operation is currently performed, and the write information is a value indicating that the write operation is not currently performed for the one pixel after the last operation of applying a driving voltage is performed in the write operation.

In such a case, the write information can be acquired through a simple process.

In addition, in the above-described display device, the display unit may include a display element having memory characteristics. The display element, for example, is an electrophoretic element.

According to still another aspect of the invention, there is provided a control device for a display device that has a display unit including a plurality of scanning lines, a plurality of data lines, and a plurality of pixels in which a write operation for changing a display state of one pixel out of the plurality of pixels from a first display state to a second display state is performed by performing a plurality of operations of applying a driving voltage. The control device includes: a writing state determining unit that determines whether or not a previous write operation is currently performed for the one pixel in a case where a new write operation is required for the one pixel; and a writing control unit that starts the new write operation for the one pixel in a case where the write operation for the one pixel is determined not to be currently performed by the writing state determining unit, and continues the write operation that is currently performed and starts the new write operation for the one pixel after completion of the previous write operation in a case where the write operation is determined to be currently performed for the one pixel by the writing state determining unit.

According to the above-described method, it is determined whether or not a write operation is currently performed in units of a pixel, and a new write operation can be started as needed from a pixel for which the writing operation has been completed. Accordingly, even in a display device having a relatively long rewriting time, the response speed of an image display can be improved.

In addition, it is preferable that the above-described control device further includes a writing information updating unit that stores write information that indicates whether or not the write operation is currently performed for the one pixel in a first storage area, wherein the writing state determining unit determines whether or not the write operation is currently performed for the one pixel based on the write information stored in the first storage area.

In such a case, it can be easily determined whether or not the write operation is currently performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described.

Figure 1:
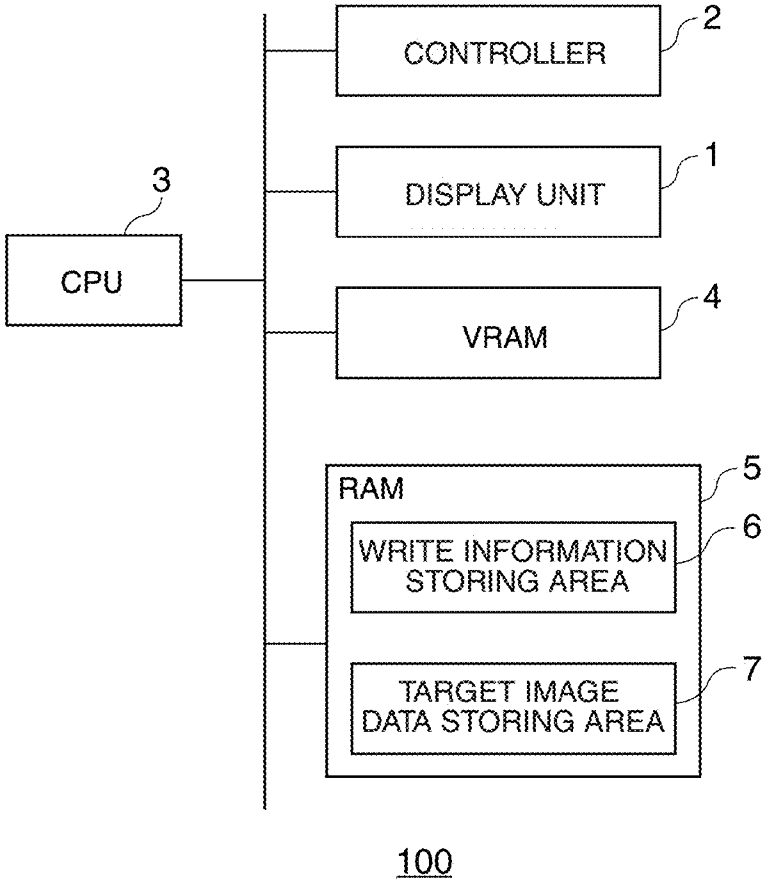
FIG. 1 is a block diagram showing the configuration of an electrophoretic display device according to an embodiment of the invention.

FIG. 1 is a block diagram showing the configuration of an electrophoretic display device (display device) 100 according to this embodiment.

As shown in FIG. 1, the electrophoretic display device 100 includes a display unit 1, a controller (control device) 2, a CPU (display image data updating unit) 3, a VRAM (second storage area) 4, and a RAM (a first storage area and a third storage area) 5.

The display unit 1 includes a display element having memory characteristics and is a display device of which the display state is maintained even in a case where a writing operation is not performed. In this embodiment, the display unit 1 is an electrophoretic-type image display device that has an electrophoretic element as the display element having the memory characteristics and includes a plurality of scanning lines, a plurality of data lines, and a plurality of pixels.

The controller 2 controls the display unit 1 by outputting an image signal that represents an image to be displayed on the display unit 1 and other various signals (a clock signal and the like).

The CPU 3 is a processor that controls the operation of the electrophoretic display device 100 and, particularly, stores image data to be displayed on the display unit 1 in the VRAM 4.

The VRAM 4 is a frame buffer and stores frame image data therein under the control of the CPU 3.

The RAM 5 includes a write information storing area (first storage area) 6 and a target image data storing area (third storage area) 7. The write information storing area 6 stores therein write information that indicates whether data is written into each pixel. The target image data storing area 7 stores therein data of an image to be displayed when a write operation that is currently performed for each pixel is completed.

The configuration of the display unit 1 will be described in detail with reference to FIGS. 2 to 4.

Figure 2:
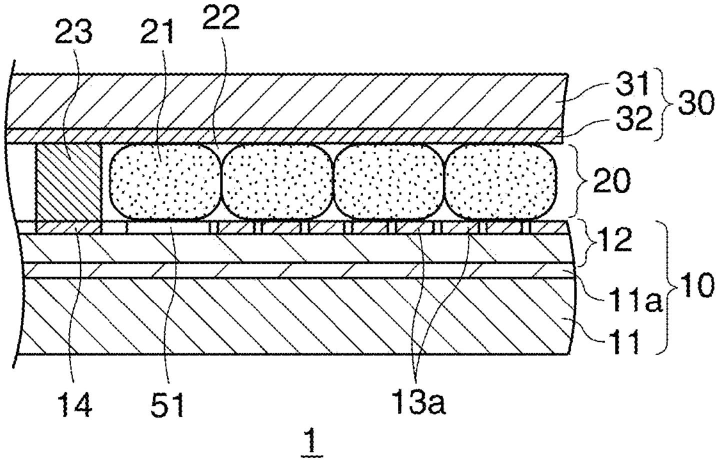
FIG. 2 is a diagram showing the cross-section of a display unit.

FIG. 2 is a diagram showing the cross-section of the display unit 1. As shown in the figure, roughly, the display unit 1 is configured by a first substrate 10, an electrophoretic layer 20, and a second substrate 30.

The first substrate 10 is acquired by forming a thin film semiconductor circuit layer 12 on a flexible substrate 11 as an insulating base substrate that forms an electric circuit.

The flexible substrate 11, for example, is a polycarbonate substrate. The semiconductor circuit layer 12 is stacked on the flexible substrate 11 through an adhesive layer 11*a*. As the material of the flexible substrate 11, a resin material that has superior lightness, flexibility, elasticity, and the like can be used.

Here, instead of the flexible substrate 11, a glass substrate or the like that does not have flexibility may be used. In such a case, the semiconductor circuit layer 12 is formed directly on the substrate without interposing the adhesive layer therebetween.

The thin film semiconductor circuit layer 12 is configured so as to include a group of wirings that are sequentially arranged in a row direction and a column direction, a group of pixel electrodes, pixel driving circuits, a connection terminal, a row decoder 51 and a column decoder (not shown) that select a pixel to be driven, and the like. The pixel driving circuit is configured so as to include a circuit element such as a thin film transistor (TFT).

The group of pixel electrodes includes a plurality of the pixel electrodes 13*a* that are arranged in a matrix pattern and forms an image display region. In the thin film semiconductor circuit layer 12, an active matrix circuit that can apply an individual voltage to each pixel electrode 13*a* is formed.

The connection electrode 14 is used for electrically connecting a transparent electrode layer 32 of the second substrate 30 and a circuit wiring of the first substrate 10 and is formed on the outer periphery portion of the thin film semiconductor circuit layer 12.

The electrophoretic layer 20 is formed over the pixel electrodes 13*a* and the outer periphery area thereof. The electrophoretic layer 20 is configured so as to include a plurality of microcapsules 21 that are fixed by a binder 22. Inside each microcapsule 21, an electrophoretic dispersion medium and electrophoretic particles are included. In addition, an adhesive layer may be further disposed between the microcapsules 21 that are fixed by the binder 22 and the pixel electrodes 13*a*.

The electrophoretic particles have a characteristic such that they move in the electrophoretic dispersion medium in accordance with an applied voltage. As the electrophoretic particles, one or more (here, two) types of electrophoretic particles are used. The electrophoretic layer 20 can be formed by mixing the microcapsules 21 with a desired permittivity regulator in the binder 22 and coating the upper face of a base with the acquired resin composition by using a known coating method.

Here, as the electrophoretic dispersion medium, for example, an alcohol-based solvent such as water or methanol, any of various esters, any of various oils, or the like can be used as a single material, or a combination of the above-described mixture with a surfactant or the like can be used.

The electrophoretic particle, as described above, is a particle (a high molecule or a colloid) having such characteristic such that it moves to a desired electrode side through electrophoresis using an electric potential difference inside the electrophoretic dispersion medium. For example, a yellow pigment, a red pigment, a blue pigment, or the like can be used, in addition to a black pigment such as aniline black or carbon black or a white pigment such as titanium dioxide or aluminum oxide. Such particles of a single type may be used, or the particles of two or more types may be used together.

As a material composing the microcapsule 21, a compound having flexibility such as gum arabic, a gelatin-based compound, or a urethane-based compound is preferably used. The material of the binder 22 is not particularly limited, as long as it has good affinity to the microcapsule 21, superior adhesiveness for the electrodes, and an insulating property.

The second substrate 30 is formed from a thin film 31 having the transparent electrode layer 32 formed on the lower face thereof and is formed so as to cover the upper face of the electrophoretic layer 20. The transparent electrode layer 32 is a common electrode that faces the plurality of the pixel electrodes 13*a*.

The thin film 31 is responsible for sealing and protecting the electrophoretic layer 20 and, for example, is configured by using a polyethylene terephthalate (PET) film. The thin film 31 is formed from a transparent material having an insulating property.

The transparent electrode layer 32 is configured by using a transparent conductive film such as tin-doped indium oxide film (ITO film). The circuit wiring of the first substrate 10 and the transparent electrode layer 32 of the second substrate 30 are connected together on the outer side of the area in which the electrophoretic layer 20 is formed. To be more specific, the transparent electrode layer 32 and the connection electrode 14 of the thin-film semiconductor circuit layer 12 are connected together through a conductive connection body 23.

Figure 3:
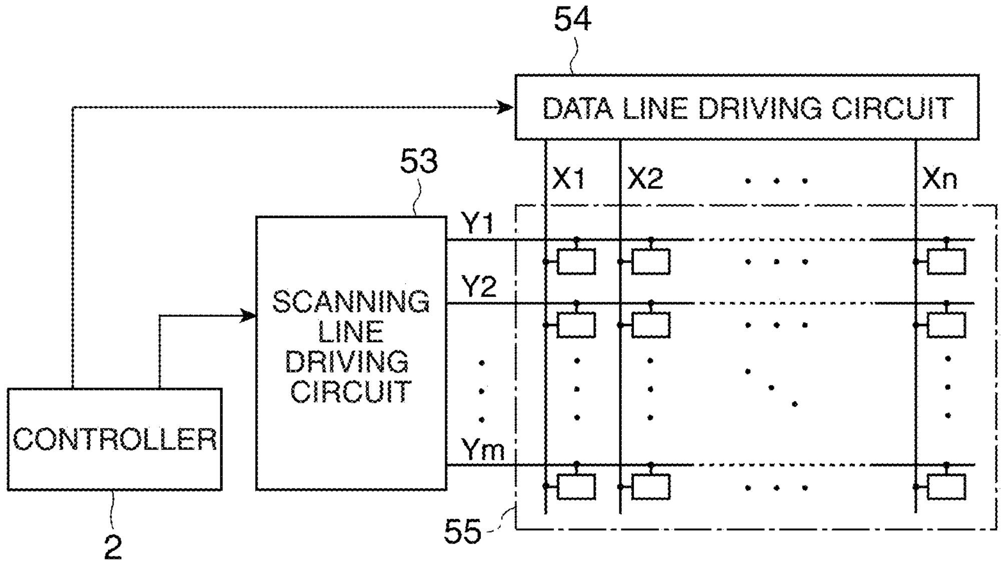
FIG. 3 is a schematic diagram illustrating the circuit configuration of a display unit.

FIG. 3 is a schematic diagram illustrating the circuit configuration of the display unit 1.

The controller 2 generates an image signal representing an image to be displayed in the image display region 55, reset data used for a resetting operation at the time of rewriting an image, and other various signals (a clock signal and the like) and outputs the signals to a scanning line driving circuit 53 or a data line driving circuit 54.

The image display region 55 has a plurality of data lines arranged in the X direction so as to be parallel to one another, a plurality of scanning lines arranged in the Y direction so as to be parallel to one another, and pixel driving circuits that are arranged at the intersections of the data lines and the scanning lines.

Figure 4:
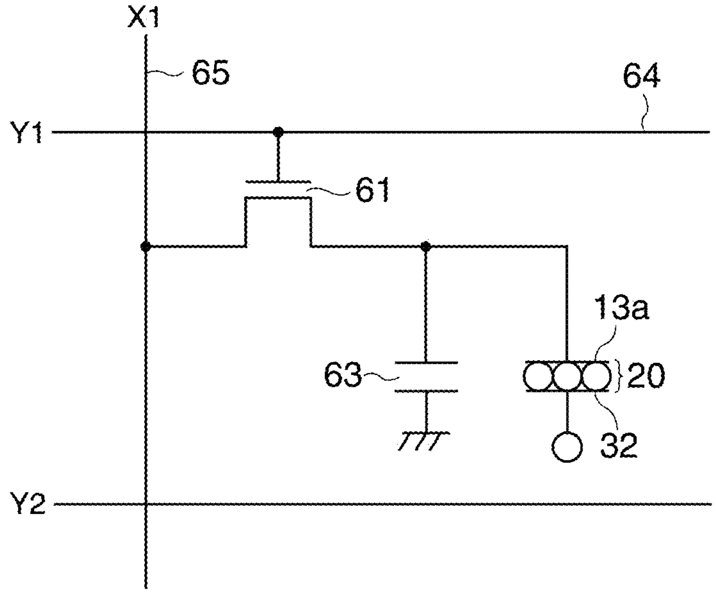
FIG. 4 is a diagram illustrating the configuration of each pixel driving circuit.

FIG. 4 is a diagram illustrating the configuration of each pixel driving circuit. In the pixel driving circuit, the gate of a transistor 61 is connected to a scanning line 64, the source thereof is connected to a data line 65, and the drain thereof is connected to a pixel electrode 13*a*. A holding capacitor 63 is connected so as to be in parallel with the electrophoretic element. Through the data line 65, voltages are supplied to the pixel electrode 13*a* included in each pixel driving circuit and the transparent electrode layer 32, and whereby the electrophoretic particles included in the electrophoretic layer 20 are migrated, thereby displaying an image.

The scanning line driving circuit 53 is connected to the scanning lines positioned in the image display region 55, selects any one of the scanning lines, and supplies each of predetermined scanning line signals Y1, Y2, . . . , Ym to the selected scanning line. These scanning line signals Y1, Y2, . . . , Ym are signals in which the active period (H-level period) is sequentially shifted. Thus, by outputting the scanning line signals to the scanning lines, the pixel driving circuits connected to the scanning lines are sequentially in the On state.

The data line driving circuit 54 is connected to the data lines positioned in the image display region 55 and supplies each of data signals X1, X2, . . . , Xn to each pixel driving circuit that is selected by the scanning line driving circuit 53. To the pixel connected to the scanning line that is in the selected state, a data signal is supplied from the data line through the transistor 61. In the holding capacitor 63 that is included in the pixel, electric charge is accumulated in accordance with the data signal supplied to the pixel, and the electric potential of the pixel electrode 13*a* is an electric potential corresponding to the electric charge. The electrophoretic particles move between both the electrodes in accordance with an electric potential difference (voltage) between the electric potential of the pixel electrode 13*a* and the electric potential of the transparent electrode layer 32, thereby performing a display operation.

A period during which each scanning line is selected once by the scanning line driving circuit 53 is referred to as a "frame period" (or briefly referred to as a "frame"). Accordingly, each scanning line is selected once during one frame, and a data signal is supplied once to each pixel during one frame.

Figure 5:
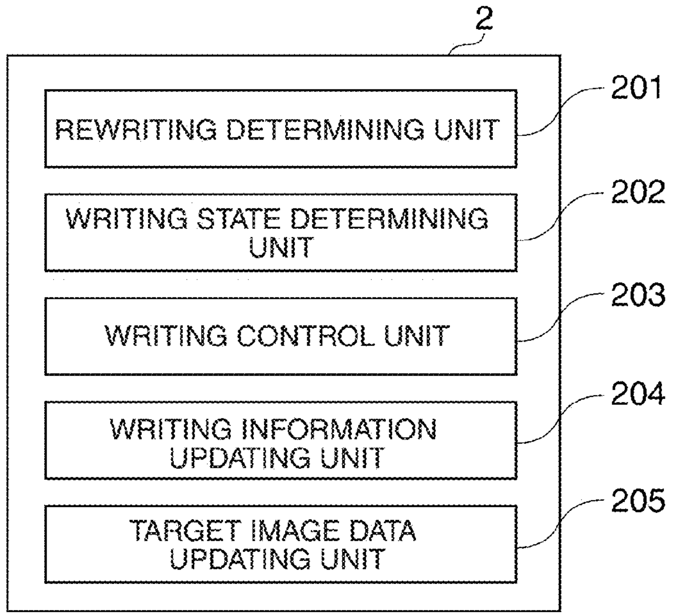
FIG. 5 is a block diagram showing a detailed configuration of a controller.

FIG. 5 is a block diagram showing a detailed configuration of the controller 2. As shown in the figure, the controller 2 includes a rewriting determining unit 201 (a rewriting judging unit), a writing state determining unit 202 (a writing state judging unit), a writing control unit 203, a writing information updating unit 204, and a target image data updating unit 205. The rewriting determining unit 201, the writing state determining unit 202, the writing control unit 203, the writing information updating unit 204, and the target image data updating unit 205 correspond to functional blocks that are realized by being performed by the processor of the controller 2.

Figure 6:
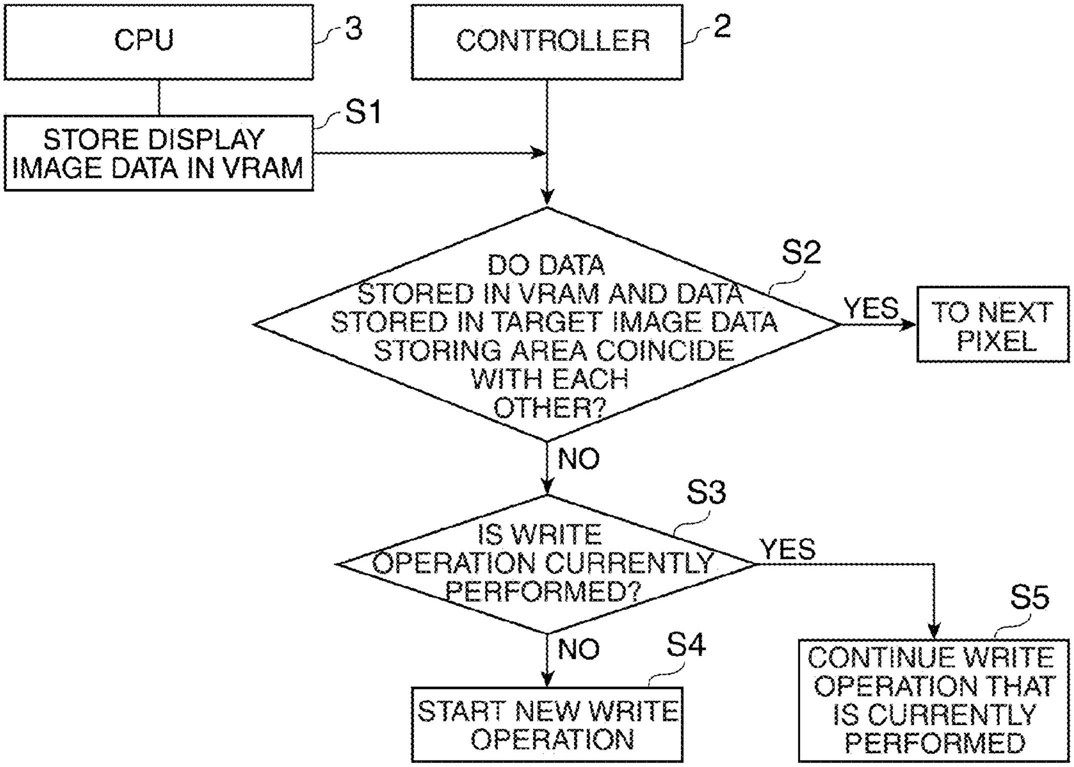
FIG. 6 is a flowchart illustrating an overview of the operation of an electrophoretic display device.

Next, an overview of the operation of the electrophoretic display device 100 will be described with reference to FIG. 6.

The CPU 3 stores display image data to be displayed on the display unit 1 in the VRAM 4 (Step S1).

The rewriting determining unit 201 of the controller 2 compares the pixel data of a display image that is stored in the VRAM 4 and the pixel data of a target image that is stored in the target image data storing area 7 for each pixel. In a case where the pixel data of the display image is different from the pixel data of the target image, the rewriting determining unit 201 determines (or judges) that a writing operation (hereinafter, referred to as a new writing operation), which is performed so as to reflect the display image data stored in the VRAM 4, is required for the pixel (Step S2: rewriting determining process).

The writing state determining unit 202 of the controller 2 determines (or judges) whether a writing operation for one pixel is currently performed by referring to write information stored in the write information storing area 6 (Step S3: writing state determining process). In the writing information storing area 6, a flag that represents the writing state of each pixel can be stored. The writing state determining unit 202 determines that a write operation is currently performed in a case where a value (flag On: first data) representing that the write operation is currently performed for a pixel is stored and determines that a writing operation is not currently performed in a case where a value (flag Off: second data) representing that the write operation is not currently performed for a pixel is stored.

The process sequence of Steps S2 and S3 may be set such that any of Steps S2 and S3 may be performed first. Furthermore, the processes of Steps S2 and S3 may be simultaneously performed.

In a case where a new write operation is determined to be required in Step S2 (Step S2: No), and a write operation is determined not to be currently performed in Step S3 (Step S3: No), the writing control unit 203 starts a new write operation for the pixel (Step S4). At this time, the writing information updating unit 204 updates the write information of the pixel to a value that represents that a write operation is currently performed. In addition, the target image data updating unit 205 overwrites the target image data of the pixel that is stored in the target image data storing area 7 with the pixel data of the display image that is stored in the VRAM 4.

On the other hand, in a case where a new writing operation is determined to be required in Step S2 (Step S2: No), and a write operation is determined to be currently performed in Step S3 (Step S3: Yes), the writing control unit 203 continues to the write operation that is currently performed (Step S5). When the write operation that is currently performed is completed, the writing information updating unit 204 updates the write information that is stored in the write information storing area 6 to a value that represents that a write operation is not currently performed. The above-described Steps S4 and S5 correspond to a write control process.

In a case where a new write operation is determined not to be required in Step S2 (Step S2: No), the process for the pixel is completed, and the process proceeds to a process for the next pixel.

Figure 7:
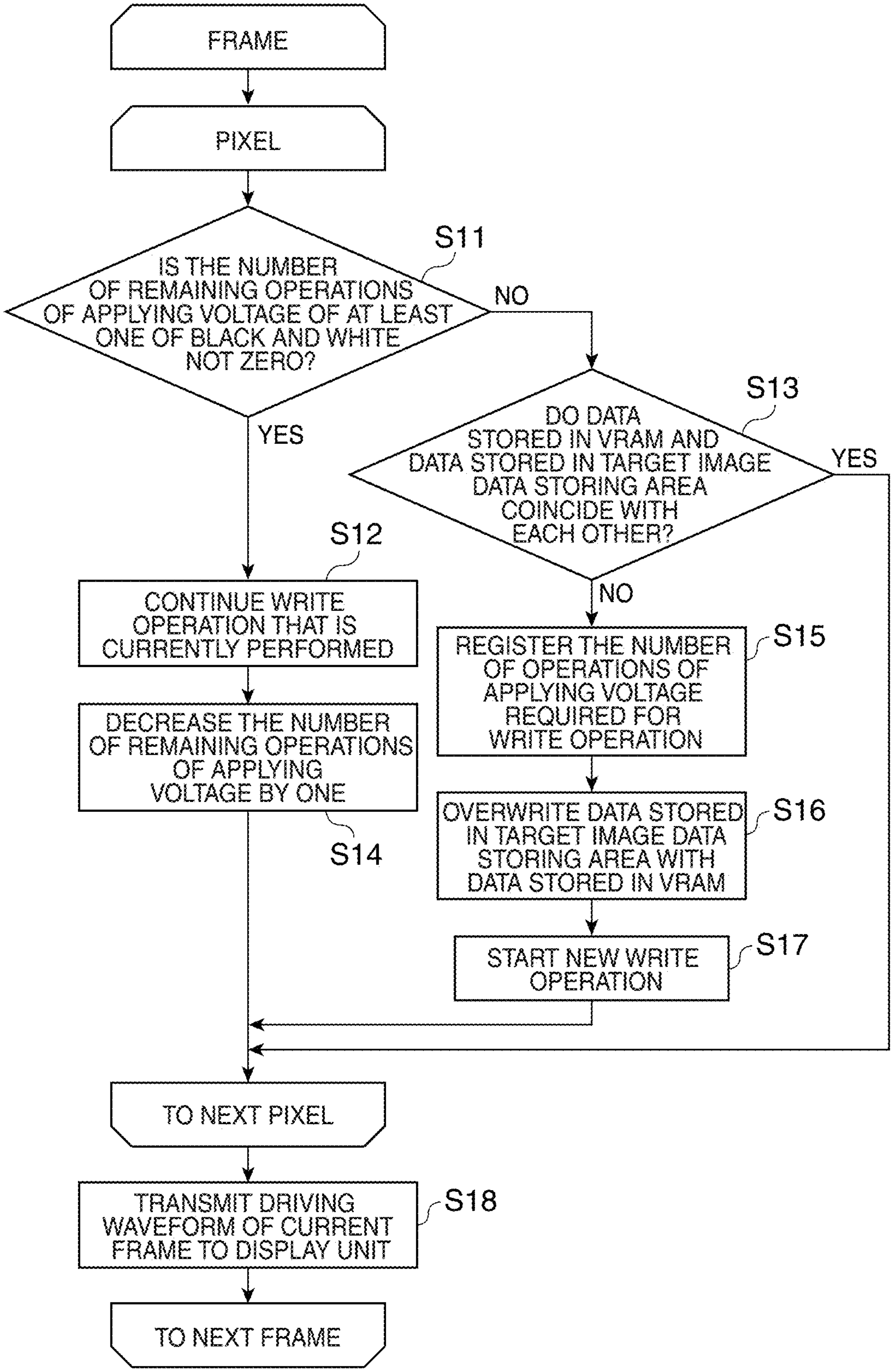
FIG. 7 is a flowchart illustrating the operation of the controller.

An example of the operation of the controller 2 will be described in detail with reference to FIG. 7.

Here, in the write information storing area 6, first write information that indicates whether or not a write operation for changing the display state of each pixel from black (a first display state) to white (a second display state) is currently performed and second write information that indicates whether or not a write operation for changing the display state of each pixel from white to black is currently performed are included.

Here, a write operation for changing the display state of each pixel from white to black or from black to white includes a plurality of frames. Accordingly, for example, the write operation for changing the display state from white to black includes a plurality of operations of supplying a data signal used for displaying black to a pixel (in other words, operations of supplying a data signal in each of the plurality of frames). FIG. 7 shows the operation during one frame of the plurality of frames.

The first and second write information are values that are changed in accordance with the number of operations of applying a driving voltage that have been already performed in the write operation. Thus, after the last operation of applying a driving voltage in the write operation, the write information has a value that indicates that a write operation for a pixel is not currently performed. Here, the write information is the number of remaining operations of applying a driving voltage until the write operation is completed. Accordingly, here, the number of remaining operations of "0" corresponds to the value (flag Off: second data) indicating that a write operation is not currently performed, and a value other than "0" corresponds to the value (flag On: first data) that indicates a write operation is currently performed.

First, the writing state determining unit 202 refers to the first and second write information (the number of remaining operations of applying a driving voltage) of a pixel that is stored in the write information storing area 6 (Step S11: writing state determining process). When at least the number of the remaining operations of applying a driving voltage of one side is other than "0" (Yes), the process proceeds to Step S12. On the other hand, when the numbers of the remaining operations of applying a driving voltage of both sides are "0", the process proceeds to Step S13.

In Step S12 (a write control process), the writing control unit 203 continues to perform the write operation that is currently performed. In addition, the writing information updating unit 204 decreases the number of the remaining operations of applying a driving voltage by one each time the operation of applying a driving voltage is performed once (Step S14: write information updating process). In a case where the number of the remaining operations of applying a driving voltage is "0", the decreasing of the number of the remaining operations is not performed.

In Step S13, the rewriting determining unit 201 compares the pixel data of the display image that is stored in the VRAM 4 of the pixel and the pixel data of the target image that is stored in the target image data storing area 7. In a case where there is a difference therebetween (No), the writing information updating unit 204 registers the number of operations of applying a voltage that is required for the write operation in the write information storing area 6 (Step S15: write information updating process).

Next, the target image data updating unit 205 overwrites the target image data that is stored in the image data storing area 7 of the pixel with the pixel data of the display image that is stored in the VRAM 4 (Step S16: target image data updating process), and the writing control unit 203 starts a write operation (Step S17: write control process).

After the above-described operations are performed for all the pixels, a driving waveform of the current frame is transmitted to the display unit 1 (Step S18).

Next, the operation of the electrophoretic display device 100 will be described by using specific examples with reference to FIGS. 8 to 15.

In FIGS. 8 to 15, A represents an image state that is actually displayed on the display unit 1 at the current time point. Pij (here, i represents a row number, and j represents a column number) represents one pixel. In each pixel Pij, a gray scale that can represent 8 steps of 0 (black) to 7 (white) is represented.

In the write information storing area 6, a white write information storing area 6A that represents whether or not a write operation for changing the display state of each pixel from black to white is currently performed and a black write information storing area 6B that represents whether or not a write operation for changing the display state of each pixel from white to black is currently performed are included.

In each of the VRAM 4, the white write information storing area 6A, the black write information storing area 6B, and the target image data storing area 7, a storage area Mij corresponding to the pixel of the display unit 1 is disposed.

In the storage area Mij of the VRAM 4, pixel data (gray scale) of the display image is stored. In addition, in the storage area Mij of the target image data storing area 7, the image data (gray scale) of the target image is stored.

In the storage area Mij of the white write information storing area 6A, the number (0 to 7) of operations of applying a voltage that is necessary until the pixel represents a white display is stored. In addition, in the storage area Mij of the black write information storing area 6B, the number (0 to 7) of operations of applying a voltage that is necessary until the pixel represents a black display is stored. Here, the number of operations of applying a voltage can be rephrased as the number of frames used for applying the voltage.

Figure 8:
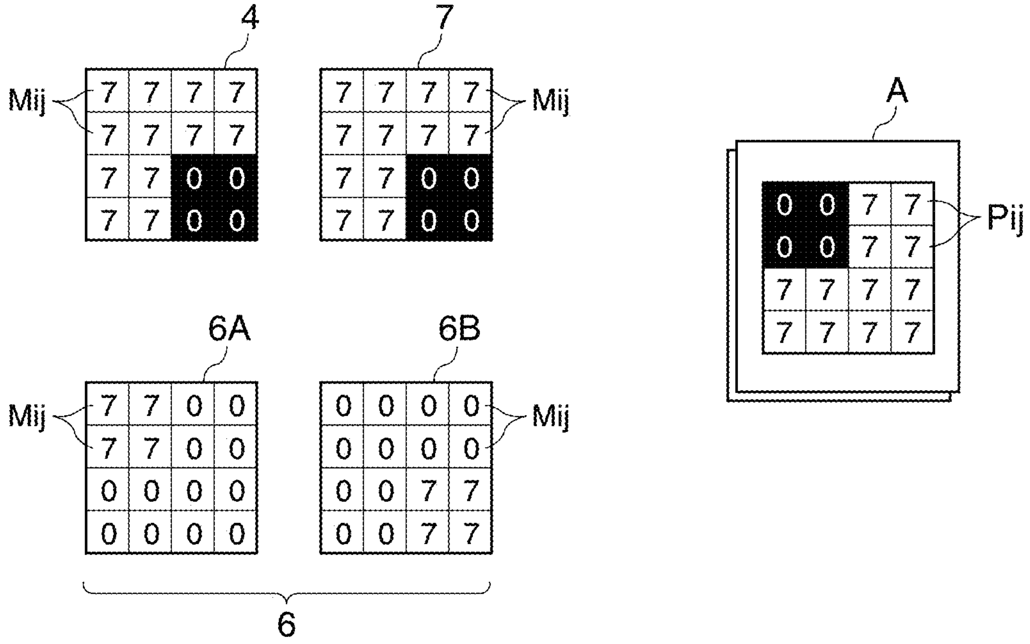
FIG. 8 is a diagram illustrating the operation of an electrophoretic display device.

In the state shown in FIG. 8, a rewrite operation from the display image A to a target image that is stored in the target image data storing area 7 is currently performed. As shown in FIG. 8, since pixels P11, P12, P21, and P22 are rewritten from black to white, the number of the remaining operations of "7" is set in the storage areas M11, M12, M21, and M22 of the white write information storing area 6A. Similarly, since pixels P33, P34, P43, and P44 are rewritten from white to black, the number of the remaining operations of "7" is set in the storage areas M33, M34, M43, and M44 of the black write information storing area 6B.

Figure 9:
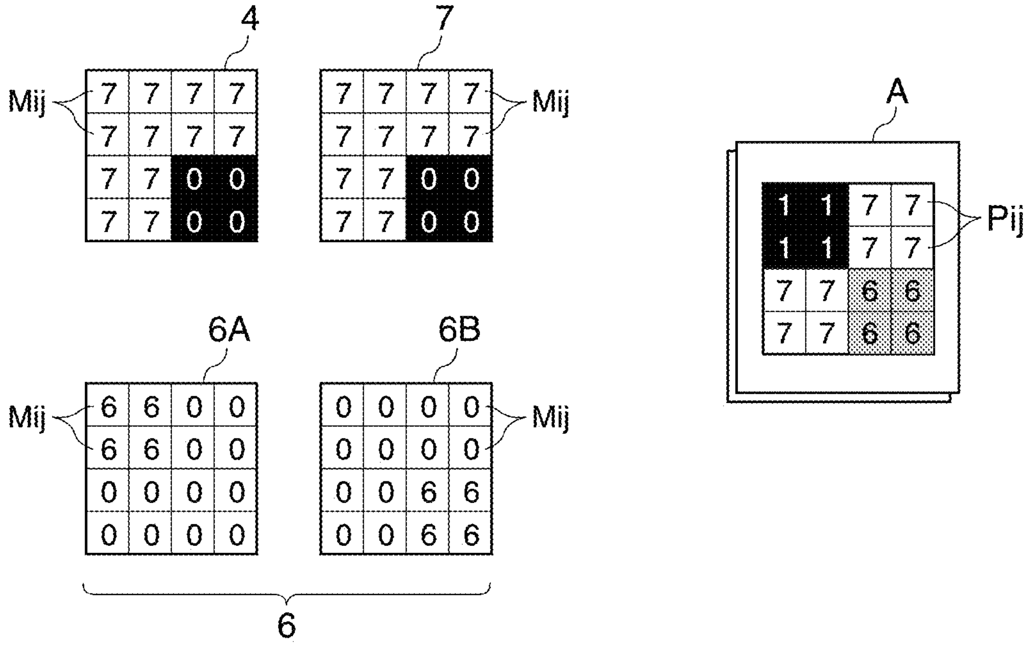
FIG. 9 is a diagram illustrating the operation of an electrophoretic display device.

FIG. 9 shows a state in which one write operation (application of a voltage), that is, a write operation for one frame is completed. As shown in the figure, the pixels P11, P12, P21, and P22 are changed in the gray scale by one gray scale in the direction of white, and the pixels P33, P34, P43, and P44 are changed in the gray scale by one gray scale in the direction of black. In addition, the numbers of the remaining operations that are stored in the storage areas M11, M12, M21, and M22 of the white write information storing area 6A and the number of the remaining operations that are stored in the storage areas M33, M34, M43, and M44 of the black write information storing area 6B are decreased by one so as to be respectively "6".

As above, each time when one write operation is performed, the gray scale of the pixel Pij is changed by one step, and the numbers of remaining operations stored in the white write information storing area 6A and the black write information storing area 6B are decreased by one.

Figure 10:
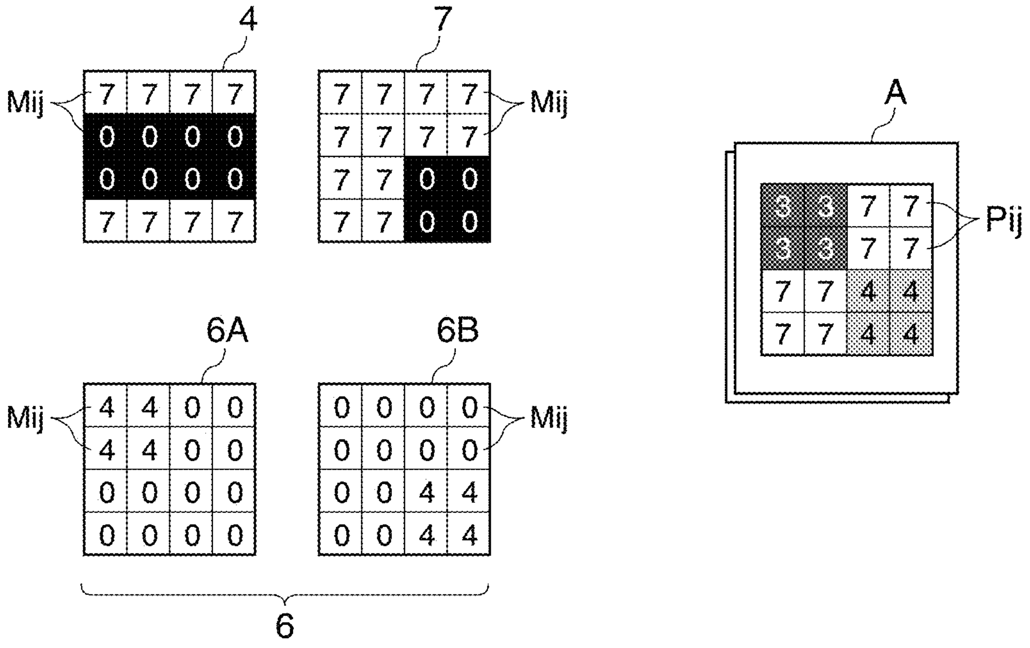
FIG. 10 is a diagram illustrating the operation of an electrophoretic display device.

FIG. 10 shows the state in which the third write operation is completed. A case where the image data stored in the VRAM 4 is changed at this timing as shown in the figure by the CPU 3 will be considered.

The writing state determining unit 202 refers to the numbers of the remaining operations that are stored in the white write information storing area 6A and the black write information storing area 6B for each pixel Pij. As a result, it is determined that the write operation is currently performed for the pixels P11, P12, P21, P22, P33, P34, P43, and P44, and a write operation is not currently performed for the other pixels (write state determining process).

The rewriting determining unit 201 compares the pixel data that is stored in the storage area Mij of the VRAM 4 and the pixel data that is stored in the storage area Mij of the target image data storing area 7 for each pixel Pij. As a result, the pixel data is determined to be different for the pixels P21, P22, P23, P24, P31, P32, P43, and P44, and the pixel data is determined to be the same for the other pixels (rewrite determining process).

As above, for the pixels P11, P12, P21, P22, P33, P34, P43, and P44, the write operation that is currently performed is continued by the writing control unit 203 (write control process).

In addition, for the pixels P23, P24, P31, and P32 for which a write operation is not currently performed, and there is a difference between the image stored in the VRAM 4 and the image stored in the target image data storing area 7, the write information storing area 6 is updated by the writing information updating unit 204. To be more specific, for the pixels P23, P24, P31, and P32, rewriting from white to black needs to be performed, and accordingly, "7" is set in the storage areas M23 and M24 of the black write information storing area 6B (write information updating process).

In addition, for the pixels P23, P24, P31, and P32, the target image data updating unit 205 overwrites the storage area Mij of the target image data storing area 7 with the data of the storage area Mij of the VRAM 4 (target image data updating process).

Figure 11:
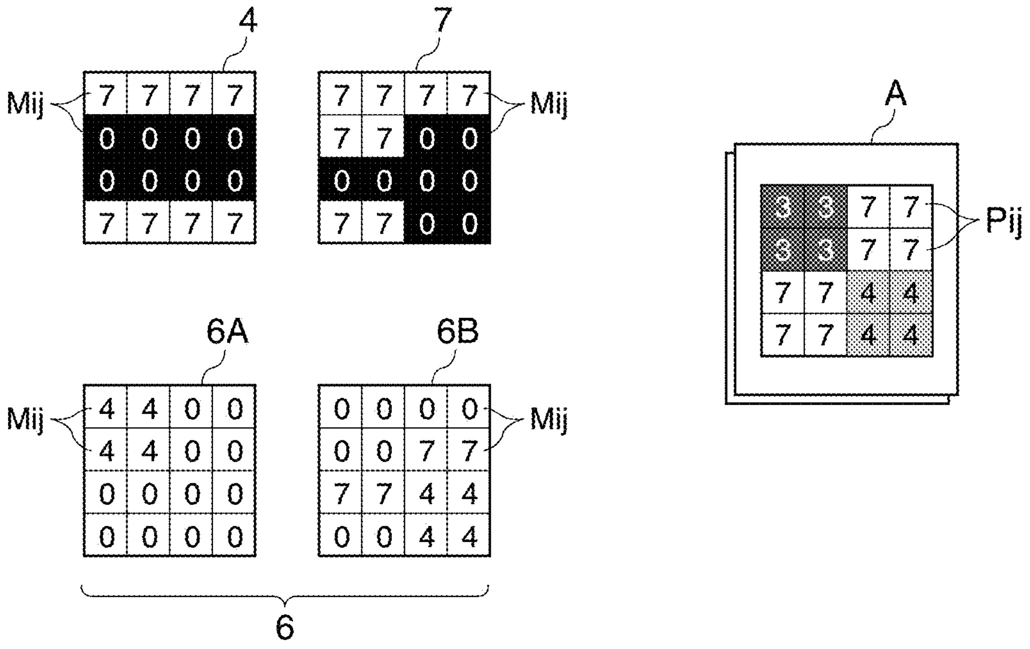
FIG. 11 is a diagram illustrating the operation of an electrophoretic display device.

As a result, the white write information storing area 6A, the black write information storing area 6B, and the target image data storing area 7 are in the state as shown in FIG. 11.

The writing control unit 203 continues to perform the write operation that has been currently performed for the pixels P11, P12, P21, P22, P33, P34, P43, and P44 and starts a new write operation for the pixels P23, P24, P31, and P32 based on the information stored in the white write information storing area 6A and the black write information storing area 6B after update (write control process).

Figure 12:
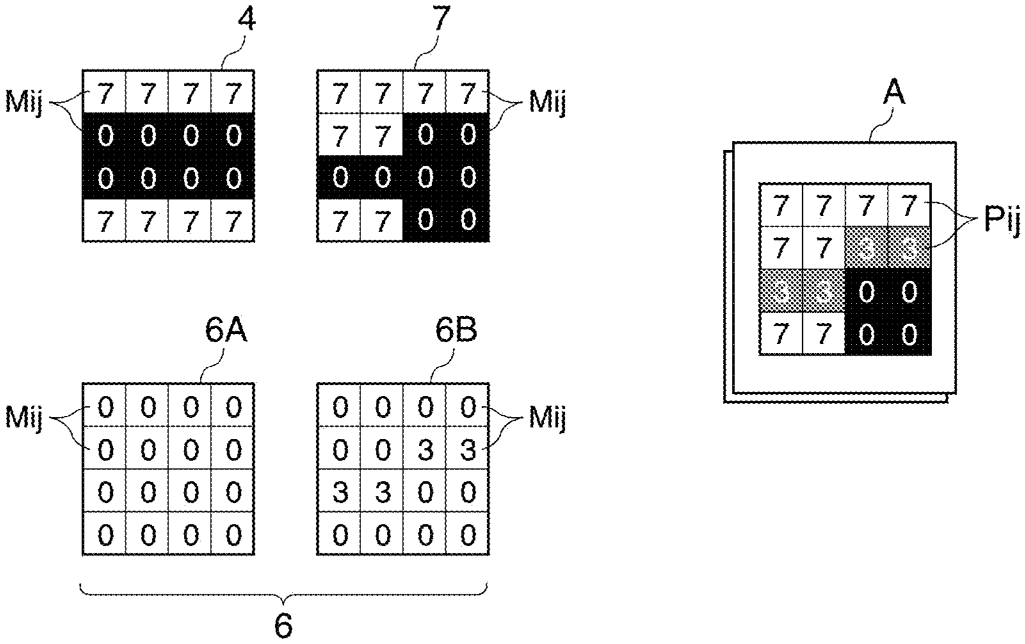
FIG. 12 is a diagram illustrating the operation of an electrophoretic display device.

FIG. 12 shows the state at a time point when four write operations are completed from the state shown in FIG. 11. As shown in the figure, the write operations are completed for the pixels P11, P12, P21, P22, P33, P34, P43, and P44, and the write operations are currently performed for the pixels P23, P24, P31, and P32.

Here, for the pixels P11, P12, P21, P22, P33, P34, P43, and P44, a write operation is determined not to be currently performed by the writing state determining unit 202 (writing state determining process). In addition, for the pixels P21, P22, P43, and P44, it is determined that the pixel data stored in the storage area Mij of the VRAM 4 and the pixel data of the storage area Mij of the target image data storing area 7 do not coincide with each other by the rewriting determining unit 201 (rewrite determining process).

Accordingly, for the pixels P21, P22, P43, and P44, the write information storing area 6 is updated by the writing information updating unit 204. To be more specific, for the pixels P21 and P22, rewriting from white to black needs to be performed, and accordingly, "7" is set in the storage areas M21 and M22 of the black write information storing area 6B. In addition, for the pixels P43 and P44, rewriting from black to white needs to be performed, and accordingly, "7" is set in the storage areas M43 and M44 of the white write information storing area 6A (write information updating process). Furthermore, for the pixels P21, P22, P43, and P44, the target image data updating unit 205 overwrites the storage area Mij of the target image data storing area 7 with the data stored in the storage area Mij of the VRAM 4 (target image data updating process).

Figure 13:
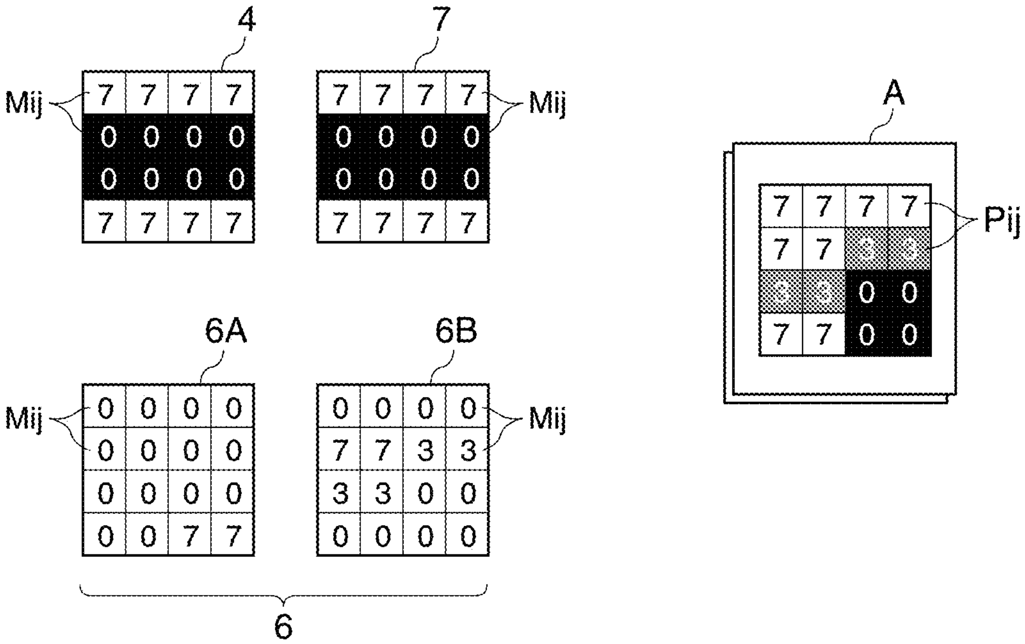
FIG. 13 is a diagram illustrating the operation of an electrophoretic display device.

As a result, the white write information storing area 6A, the black write information storing area 6B, and the target image data storing area 7 are in the states as shown in FIG. 13.

The writing control unit 203 continues to perform the write operations that are currently performed for the pixels P23, P24, P31, and P32 and starts new write operations for the pixels P21, P22, P43, and P44 based on the information stored in the white write information storing area 6A and the black write information storing area 6B after update (write control process).

Figure 14:
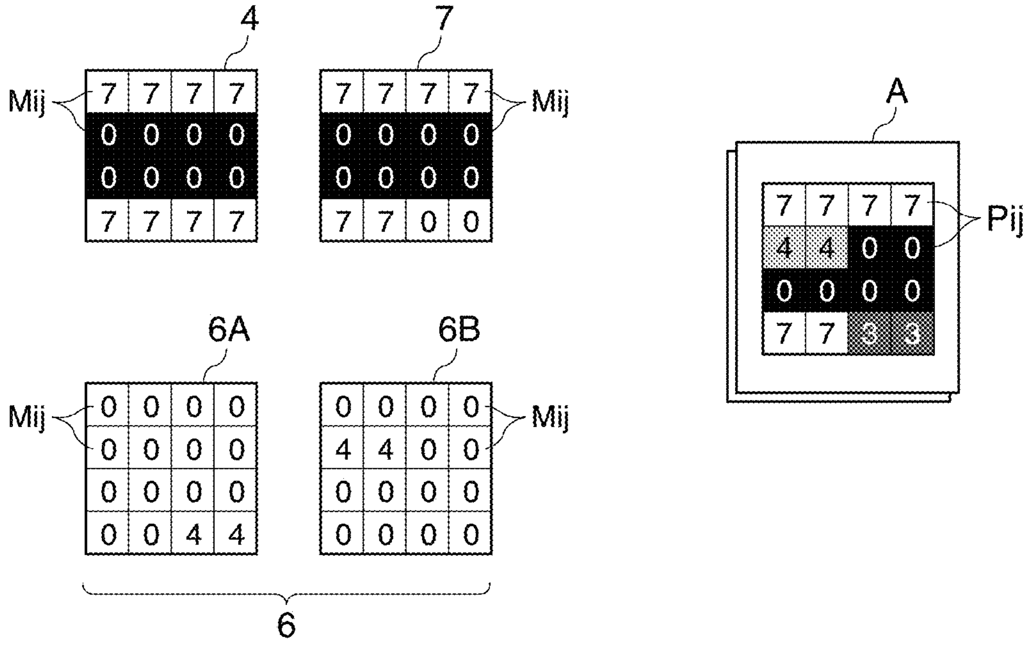
FIG. 14 is a diagram illustrating the operation of an electrophoretic display device.

FIG. 14 shows a state at a time point when three write operations are completed from the state shown in FIG. 13.

As shown in the figure, the write operations are completed for the pixels P23, P24, P31, and P32, and the write operations are currently performed for the pixels P21, P22, P43, and P44.

Figure 15:
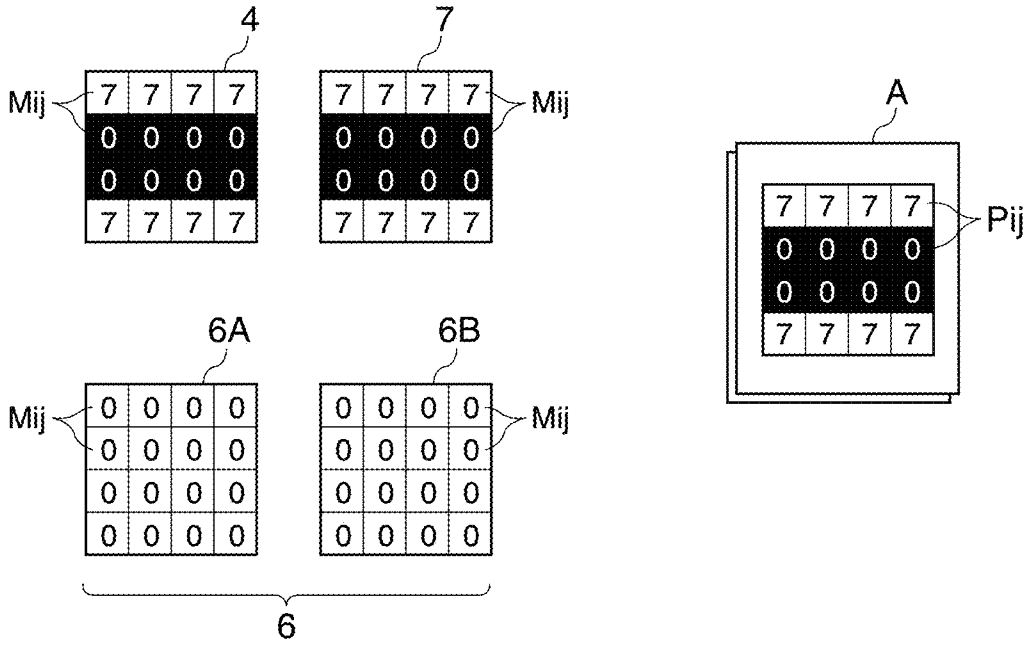
FIG. 15 is a diagram illustrating the operation of an electrophoretic display device.

FIG. 15 shows a state at a time point when three write operations are completed from the state shown in FIG. 14.

As shown in the figure, the write operations are completed for the pixels P21, P22, P43, and P44, and the drawing of an image that is stored in the VRAM 4 is completed.

As above, according to this embodiment, it is determined whether a write operation is currently performed in units of a pixel, and a new write operation is started as needed from a pixel for which a write operation is completed. Accordingly, in an electrophoretic display device that requires relatively long time for rewriting an image, a sensed response speed of an image display can be improved.

In addition, in a general method in which a write operation is performed in units of a partial area including a plurality of pixels, in a case where partial areas overlap with each other in part, the partial area for which the write operation is started later need to wait so as to be driven until the write operation, for the partial are for which the write operation is started first, is completed. However, according to this embodiment, even for the partial area for which the write operation is started later, a write operation can be immediately started for pixels of a portion that does not overlap the partial area for which the write operation is started first. In other words, even in a display in which a plurality of graphics overlap one another, a write operation is started without waiting for the completion of the previous write operation for at least a part of the portion for which the write operation is started later. Therefore, a sensed response speed can be improved.

In addition, according to this embodiment, only by writing image data into the VRAM 4 by using the CPU 3, the controller 2 is reflected on the display of the display unit 1. Accordingly, a developer of an application for the electrophoretic display device can generate applications more efficiently. To be more specific, an application can be generated by using the same technique as that of a general display device such as a liquid crystal or a CRT without designating a write area or performing a drawing start command, unlike a controller for a general electrophoretic display device.

In addition, according to this embodiment, when a new write operation is performed for each pixel, the content of the target image data storing area 7 is overwritten with the content of the VRAM 4. Accordingly, as long as the data of the VRAM 4 and the data of the target image data storing area 7 coincide with each other, no rewriting target is detected, and therefore, an unnecessary write operation can be excluded.

In addition, for a pixel for which the start of a new write operation is delayed due to a write operation that is currently performed, the data of the pixel is compared with the pixel data stored in the VRAM 4 at a time point when the write operation is completed. Accordingly, the latest state of the VRAM 4 can be reflected all the time.

In addition, in this embodiment, although the controller 2 includes the rewriting determining unit 201 and the target image data updating unit 205, the rewriting determining unit 201 and the target image data updating unit 205 may be realized as the functions of the CPU 3. In such a case, the controller 2 does not need to refer to the content of the VRAM 4.

In addition, in this embodiment, a case is assumed in which a black and white display is performed by using two types of black and white electrophoretic particles including one type having positive electric charge and the other type having negative electric charge as electrophoretic particles. However, an embodiment of the invention can be applied not only to the black and white display but also to a display on the basis of density changes in two directions such as a red-and-white, blue-and-black, or the like on the basis of density differences.

In addition, the configuration of the display unit 1 is not limited to those shown in FIGS. 1 to 3. For example, the configuration of the electrophoretic layer is not limited to the configuration that includes a plurality of microcapsules and may be a configuration in which an electrophoretic dispersion medium and electrophoretic particles are included in spaces divided by a partition wall.

In addition, in the description presented above, the electrophoretic display device 100 having the electrophoretic-type display unit 1 has been described as an example of the display device. However, the display type of the display unit 1 is not limited to the electrophoretic type. The display type of the display unit 1 may be a type that is a relative slow display type and is controlled by using a method of applying a voltage for a plurality of frames until the completion of a display. For example, a cholesteric liquid crystal, an electrochromic, an electron power fluid, or the like may be used.

In addition, an embodiment of the invention can be applied to an electrophoretic display device in which the electrophoretic particles are moved by controlling only the electric potential of the pixel electrode to have a high electric potential or a low electric potential (bipolar driving) or an electrophoretic display device in which the electric potentials of both the pixel electrode and the common electrode are controlled to have a high electric potential and a low electric potential (unipolar driving).

In addition, the controller 2 and the CPU 3 may be mounted on different devices or may be mounted on one chip such as an SOC (System-on-a-chip).

In addition, in this embodiment, the number of the remaining operations of applying a voltage until the completion of the write operation is used as the write information. However, the write information is not limited thereto and may be any type of data as long as it can be used for determining whether or not a write operation is currently performed.

When the number of the operations of applying a voltage that is stored in the write information storing area 6 is zero, and the content of the VRAM 4 and the content of the target image data storing area 7 coincide with each other, in other words, when the applying of a voltage is not necessary for the time being, the process may proceed to another state such as a power-saving state until new image data is transmitted from the outside.

It may be configured such that coordinates of a rectangular area in which a pixel having its flag in the On state is included are stored each time a new write operation is performed (for example, each time when the image data of the VRAM 4 is changed by the CPU 3), and, when the write operation for the stored rectangular area is completed, a flag for a portion not overlapping a rectangular area that has been newly set due to a new write operation performed thereafter is reset to Off. Here, the rectangular area may have another shape as a circular area, an oval area, or the like.

Instead of decreasing the number of the remaining operations each time when the writing operation for one frame is completed, a predetermined number of the same driving operations (a predetermined number of frames) for each decrease may be repeated. In such a case, the memory communication frequency band can be saved.

In the unipolar driving, instead of decreasing the number of the remaining operations each time when the writing operation for one frame is completed, a predetermined number of driving operations (a predetermined number of frames) for each decrease may be repeated. After a voltage for writing white is applied a predetermined number of times, a voltage for writing black may be applied a predetermined number of times, or a black voltage and a white voltage may be alternately applied a predetermined number of times. In addition, a ratio between the number of times of applying a voltage for writing white and the number of times of applying a voltage for writing black may be changed.

When new image data is transmitted from the outside (for example, when the image data of the VRAM 4 is changed by the CPU 3), it may be configured such that the number of write operations or the target image is not calculated for each frame, but calculated for each predetermined number of frames.

In the above-described embodiment, the write information storing area 6 and the target image data storing area 7 are configured as independent different faces (the planar type). However, the write information storing area 6 and the target image data storing area 7 may not be handled as different faces, but one face may be configured in the state in which both are put together (the packed pixel type).

Figure 16A:
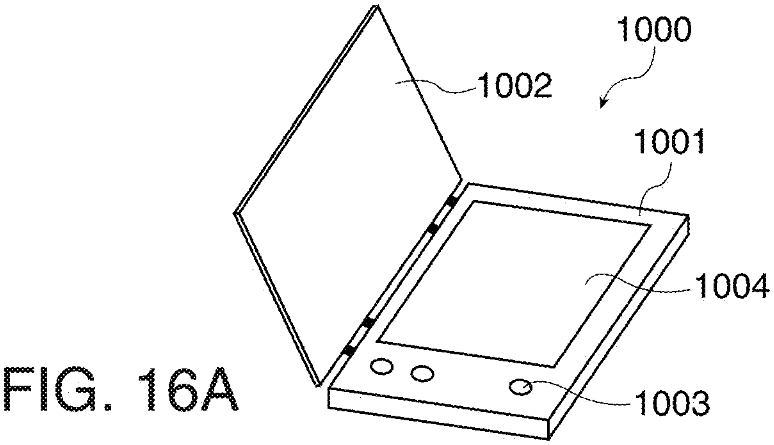
FIGS. 16A to 16C are diagrams illustrating applications of a display device according to an embodiment of the invention.
Figure 16B:
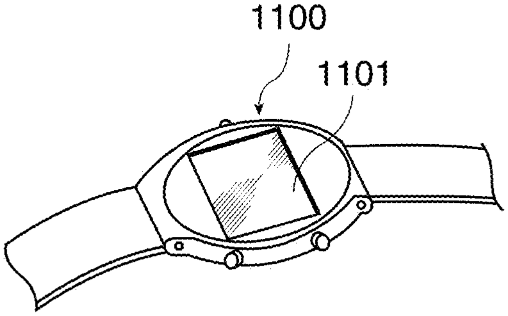
Figure 16C:
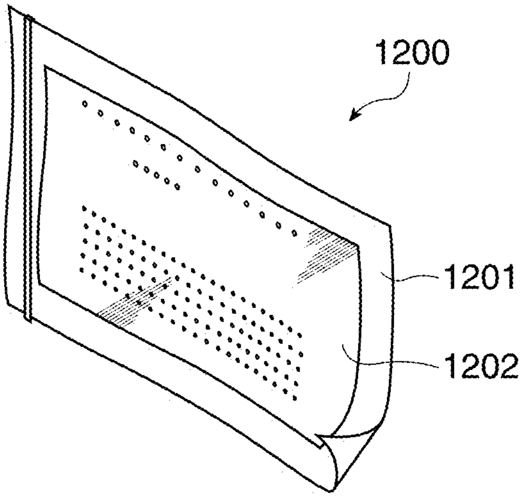

FIGS. 16A, 16B, and 16C are perspective views illustrating applications of a display device according to an embodiment of the invention.

FIG. 16A is a perspective view showing an electronic book. This electronic book 1000 includes a book-shaped frame 1001, a cover 1002 that is disposed so as to freely turnable (to be able to be opened or closed) with respect to the frame 1001, an operation unit 1003, and a display unit 1004 that is configured by a display device according to an embodiment of the invention.

FIG. 16B is a perspective view showing a wrist watch. This wrist watch 1100 includes a display unit 1101 that is configured by a display device according to an embodiment of the invention.

FIG. 16C is a perspective view of an electronic paper apparatus. This electronic paper apparatus 1200 includes a main body unit 1201 that is configured by a rewritable sheet that has the same texture and flexibility as those of a paper sheet and a display unit 1202 that is configured by a display device according to an embodiment of the invention.

The applications of a display device according to an embodiment of the invention is not limited thereto, and the display device may be broadly applied to an apparatus using a visual change in the color tone accompanied by the movement of charged particles such as a personal computer, a PDA, or a cellular phone.

The entire disclosure of Japanese Patent Application No. 2010-110881, filed May 13, 2010 is expressly incorporated by reference herein.

What is claimed is:

1. A method of controlling a display device that has a display unit including a plurality of scanning lines, a plurality of data lines, and a plurality of pixels in which a write operation for changing a display state of the plurality of pixels from a first display state to a second display state is performed by performing a plurality of operations of applying a driving voltage, the method comprising:

determining whether or not a new write operation is required for each of the plurality of pixels;

determining whether or not a previous write operation is still being currently performed wherein a driving voltage is presently being applied to change the display state from a gray level to another gray level for each of the plurality of pixels in a case where the new write operation is determined to be required;

starting the new write operation for a first pixel of the plurality of pixels which are determined as having completed the previous write operation, while simultaneously continuing the previous write operation that is currently being performed for a second pixel of the plurality of pixels which are determined as still performing the previous write operation until it is completed, and starting the new write operation for the second pixel after completion of the previous write operation;

storing display image data to be displayed on the display unit based on the input display image data in a first storage area; and storing data of a target image to be displayed on the display unit by the write operation that is currently performed in a second storage area, wherein, in the storing of data of a target image, pixel data of one pixel of the plurality of pixels is replaced with pixel data corresponding to data of the display image at a timing when the new write operation is started for the one pixel, and wherein, in the determining of whether a new write operation is required, the new write operation is determined to be required for the one pixel in a case where the pixel data of the display image that is stored in the first storage area and the pixel data of the target image that is stored in the second storage area are different from each other.

2. The method according to claim 1, further comprising:

storing write information that indicates whether or not the write operation is currently performed for one pixel of the plurality of pixels in a third storage area, wherein, in the determining of whether a previous write operation is currently performed, whether or not the write operation is currently performed for the one pixel is determined based on the write information stored in the third storage area.

3. The method according to claim 2, wherein the write information stored in the third storage area is either first data indicating that the write operation is currently performed for the one pixel or second data indicating that the write operation for the one pixel is not currently performed.

4. The method according to claim 2, wherein the write information stored in the third storage area includes first write information that indicates whether or not the write operation for changing the display state of the one pixel from the first display state to the second display state is currently performed and second write information that indicates whether or not the write operation for changing the display state of the one pixel from the second display state to the first display state is currently performed, wherein the write information is a value that is changed in accordance with the number of the operations of applying a driving voltage, which have been already performed, in a case where the write operation is currently performed, and wherein the write information is a value indicating that the write operation is not currently performed for the one pixel after the last operation of applying a driving voltage is performed in the write operation.

5. A display device that has a display unit including a plurality of scanning lines, a plurality of data lines, and a plurality of pixels in which a write operation for changing a display state of the from a first display state to a second display state is performed by performing a plurality of operations of applying a driving voltage the display device comprising:

a rewriting determining unit that determines whether a new write operation is required for each of the plurality of pixels;

a writing state determining unit that determines whether or not a previous write operation is still being currently performed wherein a driving voltage is presently being applied to change the display state from a gray level to another gray level for each of the plurality of pixels in a case where the new write operation is determined to be required;

a writing control unit that starts the new write operation for a first pixel of the plurality of pixels which are determined as having completed the previous write operation by the writing state determining unit, while simultaneously continuing the previous write operation that is currently being performed for a second pixel of the plurality of pixels which are determined as still performing the previous write operation until it is completed, and starts the new write operation for the second pixel after completion of the previous write operation;

a display image data updating unit that stores display image data to be displayed on the display unit in a first storage area; and a target image data updating unit that stores data of a target image to be displayed on the display unit by the write operation that is currently performed in a second storage area, wherein the target image data updating unit replaces pixel data of one pixel of the plurality of pixels with pixel data corresponding to data of the display image at a timing when the new write operation is started for the one pixel, and wherein the rewriting determining unit determines that the new write operation is required for the one pixel in a case where the pixel data of the display image that is stored in the first storage area and the pixel data of the target image that is stored in the second storage area are different from each other.

6. The display device according to claim 5, further comprising:

a writing information updating unit that stores write information that indicates whether or not the write operation is currently performed for one pixel of the plurality of pixels in a third storage area, wherein the writing state determining unit determines whether or not the write operation is currently performed for the one pixel based on the write information stored in the third storage area.

7. The display device according to claim 6, wherein the write information stored in the third storage area is either first data indicating that the write operation is currently performed for the one pixel or second data indicating that the write operation for the one pixel is not currently performed for the one pixel.

8. The display device according to claim 6, wherein the write information stored in the third storage area includes first write information that indicates whether or not the write operation for changing the display state of the one pixel from the first display state to the second display state is currently performed and second write information that indicates whether or not the write operation for changing the display state of the one pixel from the second display state to the first display state is currently performed, wherein the write information is a value that is changed in accordance with the number of the operations of applying a driving voltage, which have been already performed, in a case where the write operation is currently performed, and wherein the write information is a value indicating that the write operation is not currently performed for the one pixel after the last operation of applying a driving voltage is performed in the write operation.

9. The display device according to claim 5, wherein the display unit includes a display element having memory characteristics.

10. The display device according to claim 9, wherein the display element is an electrophoretic element.

11. A control device for a display device that has a display unit including a plurality of scanning lines, a plurality of data lines, and a plurality of pixels in which a write operation for changing a display state of the plurality of pixels from a first display state to a second display state is performed by performing a plurality of operations of applying a driving voltage, the control device comprising:

a writing state determining unit that determines whether or not a previous write operation is still being currently performed wherein a driving voltage is presently being applied to change the display state from a gray level to another gray level for each of the plurality of pixels in a case where a new write operation is required for one pixel of the plurality of pixels;

a writing control unit that starts the new write operation for a first pixel of the plurality of pixels which are determined as having completed the previous write operation by the writing state determining unit, while simultaneously continuing the previous write operation that is currently being performed for a second pixel of the plurality of pixels which are determined as still performing the previous write operation until it is completed, and starts the new write operation for the second pixel after completion of the previous write operation;

a display image data updating unit that stores display image data to be displayed on the display unit in a first storage area; and a target image data updating unit that stores data of a target image to be displayed on the display unit by the write operation that is currently performed in a second storage area, wherein the target image data updating unit replaces pixel data of one pixel of the plurality of pixels with pixel data corresponding to data of the display image at a timing when the new write operation is started for the one pixel, and wherein the writing state determining unit determines that the new write operation is required for the one pixel in a case where the pixel data of the display image that is stored in the first storage area and the pixel data of the target image that is stored in the second storage area are different from each other.

12. The control device according to claim 11, further comprising:

a writing information updating unit that stores write information that indicates whether or not the write operation is currently performed for the one pixel in a third storage area, wherein the writing state determining unit determines whether or not the write operation is currently performed for the one pixel based on the write information stored in the third storage area.

13. A method of controlling a display device that has a display unit including a plurality of scanning lines, a plurality of data lines, and a plurality of pixels in which a write operation for changing a display state of the plurality of pixels from a first display state corresponding to a first display image data to a second display state corresponding to a second display image data is performed by performing a plurality of frames of applying a driving voltage, the method comprising:

receiving the second display image data after the first display image data, the second display image data differing from the first display image data;

determining whether or not a new write operation is required for each of the plurality of pixels so that the display device displays the second display image data rather than the first image data;

determining whether or not a previous write operation for displaying the first display image data is still being currently performed for each of the plurality of pixels in a case where the new write operation is determined to be required;

starting the new write operation for a first pixel of the plurality of pixels which are determined as having completed the previous write operation, while simultaneously continuing the previous write operation that is currently being performed for a second pixel of the plurality of pixels which are determined as still performing the previous write operation until it is completed, and starting the new write operation for the second pixel after completion of the previous write operation;

storing display image data to be displayed on the display unit based on the input display image data in a first storage area; and storing data of a target image to be displayed on the display unit by the write operation that is currently performed in a second storage area, wherein, in the storing of data of a target image, pixel data of one pixel of the plurality of pixels is replaced with pixel data corresponding to data of the display image at a timing when the new write operation is started for the one pixel, and wherein, in the determining of whether a new write operation is required, the new write operation is determined to be required for the one pixel in a case where the pixel data of the display image that is stored in the first storage area and the pixel data of the target image that is stored in the second storage area are different from each other.

* * * * *